Patented Jan. 5, 1954

2,665,216

UNITED STATES PATENT OFFICE 2,665,216

STABILIZED ICE-CREAM COMPOSITIONS

Jonas Kamlet, Stratford, Conn., assignor to The B. F. Goodrich Company, New York, N. Y., a corporation of New York No Drawing. Application December 30, 1952, Serial No. 328,812

3 Claims. (Cl. 99—136)

This invention relates to edible ice cream compositions containing salts of polyacrylic acid, and more particularly to ammonium or alkali metal salts of polyacrylic acid incorporated within ice cream compositions as stabilizers therefor.

The incorporation of stabilizing agents in edible ice cream compositions is well known in the art, and such materials are used to impart properties inherently desirable in ice cream compositions. Properties, such as (1) improved taste and texture, (2) decreased amounts of large ice crystals (graininess), and (3) increased controllability of over-run can be obtained with a suitable stabilizer. Stabilizers, such as, sodium alginate ("algin"), mono and diglycerides of a higher fatty acid, and many other substances have been used to a great extent as stabilizers for ice cream compositions. The most efficient use of sodium alginate involves, inter alia, the correlary use of sodium polyphosphate to sequester calcium ions in the cream and to prevent graininess and calcium plug.

Mono and diglycerides of higher fatty acids, for example, glycerol 1,3-dipalmitate, glycerol 1,3-distearate, and glycerol mono-laurate, etc., which are condensation products of glycerol and saturated fatty acids containing 10 to 24 carbon atoms have also been suggested as stabilizers for ice cream. The stabilizing action of the glycerides is apparently due to a free unesterified hydroxy group attached to such compounds.

These known stabilizers impart some of the properties inherently desirable in ice cream compositions, but have a number of disadvantages. One characteristic of ice cream compositions stabilized with alginate or glycerides is that they sometimes impart an undesirable taste or odor and therefore reduce the edible appeal of such compositions.

It is the object of this invention to provide stabilizers for ice cream compositions that do not impart undesirable taste and odor properties to ice cream compositions.

It is a further object of this invention to provide a class of stabilizers that will allow increased controllability of over-run of ice cream compositions.

These and many other objects will be apparent from the following description of this invention.

In the practice of the invention an ice cream composition is made to contain essentially milk, cream, sugar, and as a stabilizer, a water-soluble salt of polyacrylic acid. A typical formulation for ice cream manufacture is found in "Theory and Practice of Ice Cream Making" by Hugo H. Summer. The butterfat, serum solids, and total solids of this ice cream are such that the composition falls in the average range of commercial formulations. The formula is as follows. All percentages are by weight. Sugar, 14.0%; condensed milk, 38.4%; 40% cream, 21.3%; 3.5% milk, 25.5%; vanilla, 0.4%; and stabilizer, 0.4%.

Although the stabilizer may be any desired water-soluble alkali metal or ammonium salt of polyacrylic acid, it is preferable to use the alkali metal or ammonium salt of polyacrylic acid of a molecular weight such that a water solution thereof of 15% polymer solids content possesses a viscosity in centipoises, as determined using a Brookfield Rotating Viscosimeter at 78° C., of at least 1,000, and more preferably in the range of 5,000 to 10,000, although polyacrylic acids whose 15% water solutions possess a viscosity, as thus determined, even as high as 100,000 may also be used. In general, polyacrylic acids of a molecular weight from as low as 1,000 to as high as 30,000 or 50,000 or even 80,000 may be used. Such polyacrylic acids are readily prepared from acrylic acid monomer by its polymerization, in the manner known to the art, at temperatures in the range of 30 to 100° C., in a water media or in an organic solvent in the presence of a polymerization catalyst or initiator, such as peroxygen compounds. The properties and nature of the polymer can be varied over a considerable range by a proper choice of catalysts and/or polymerization conditions.

Neutralization of a solution of polyacrylic acid in water of 15% polymer content possessing a viscosity of 5,000 to 10,000 centipoises (Brookfield) at 78° C. with sodium hydroxide, or any other alkali metal hydroxide or ammonium hydroxide yields a water solution of the desired alkali metal or ammonium polyacrylate from which the solid salt may be separated in the usual manner.

The amount of polyacrylate added to the ice cream composition may vary over a wide range of values. An amount from 0.05% to 1.0% of polyacrylate based on the weight of the composition is operable within the scope of this invention, although in most cases optimum results are obtained when the polyacrylate stabilizer is present in an amount from 0.20% to 0.40% by weight of the ice cream composition.

The following examples are given to define and to illustrate the ice cream compositions of this invention, but in no way to limit the invention to the precise compositions, conditions, and proportions described therein since numerous variations will occur to those skilled in the art.

EXAMPLE I

A sodium polyacrylate polymer was prepared by water polymerization of acrylic acid monomer in the presence of a potassium persulfate polymerization catalyst and neutralization of the resulting polyacrylic acid with sodium hydroxide. The polyacrylate possessed a viscosity of 5,000 to 10,000 centipoises (Brookfield) at 78° C. and a 1.12 specific gravity. This polyacrylate was employed in making an ice cream composition of the formula given below by the method customarily employed in the art. Properties inherent in the ice cream compositions, such as taste, texture, over-run, stability, and body were determined by inspection, taste and feel of the ice cream. The ice cream formulation and the conclusions of the evaluation are found in the following table:

*Table I*

| Ingredient | Percent | Butterfat | Serum solids | Total solids |
|---|---|---|---|---|
| Sugar | 14.0 | 0.0 | 0.0 | 14.0 |
| Condensed milk | 38.4 | 3.07 | 7.68 | 10.75 |
| 40% cream | 21.3 | 8.50 | 1.13 | 9.68 |
| 3.5% milk | 25.5 | 0.91 | 2.20 | 3.11 |
| Vanilla | 0.4 | 0.0 | 0.0 | 0.1 |
| Stabilizer (sodium polyacrylate) | 0.4 | 0.0 | 0.0 | 0.4 |
|  | 100.0 | 12.5 | 11.0 | 38.0 |

*Conclusions*

(a) Sodium polyacrylate stabilized ice cream compositions do not possess undesirable odors or tastes.

(b) Sodium polyacrylate stabilizers improve the texture of ice cream to a slight degree.

EXAMPLE II

In order further to determine the relative merits of polyacrylate stabilizers in ice cream compositions, ice cream compositions containing various percentages of polyacrylate stabilizers were compared with an ice cream composition of the same formulation but not containing a stabilizer. The formulation used was that of Example I. An impartial panel of six men were given three different ice cream compositions, identified as ice cream A, B and C, and each panel member wrote on a separate sheet of paper his opinion as to the (a) taste, including any aftertaste; (b) feeling in the mouth, including any disagreeable coating of the tongue, roughness, stickiness, lumpy feeling, etc.; (c) texture, from appearance and feel to the fingers; (d) ice crystal formation during freezing and after storage; (e) meltdown, including any tendency for serum drainage during melting; also, (f) the relative rate of melting, of the subject creams. The percentage over-run of ice cream compositions A, B and C was also measured quantitatively. Percentage over-run is defined as the ratio of the increase in volume occupied by an ice cream composition after aeration to the volume occupied by said ice cream composition prior to aeration, with the numerical ratio expressed in percentage. Aeration involves vigorously beating air into the mixture until the liquid ice cream reaches its maximum volume. The majority opinion of the panel members and percentage over-run is tabulated in the following table:

*Table II*

| Formulation | Stabilizer | Taste | Feeling in mouth | Texture | Ice crystals | Melt down | Overrun, percent |
|---|---|---|---|---|---|---|---|
| A | None | Good, no aftertaste. | Rough | Coarse grainy | Many large | Very rapid water separation. | 12.0 |
| B | Sodium polyacrylate 0.4% by weight. | Good | Fast melting. | Fair | Flaky | Rapid, no separation. | 33.3 |
| C | Sodium polyacrylate 0.2% by weight. | ----do---- | Smoother than A. | Slightly grainy | None | Slow | 32.6 |

Sodium polyacrylate stabilized ice creams possess an overrun percentage of 33.3%, when the ice cream is homogenized. It should be noted that over-run is a measure of the ability of the mixture to contain air and still maintain a satisfactory body. In the case of high butterfat ice cream, over-run is necessary in order to reduce the greasy texture of such ice cream. In all cases it is an economic factor since it represents the increase in volume of the ice cream during the freezing, and since ice cream is sold on a volume basis it appreciably affects the profits of manufacture.

It is thus apparent that ammonium or alkali metal salts of polyacrylic acid are good stabilizers, improve the body and texture of ice cream, and do not impart disagreeable taste or odor to ice cream compositions.

Having described the invention and specific embodiments thereof it is not intended that this invention be limited except by the spirit and scope of the following claims.

I claim:

1. An ice cream composition comprising milk, cream, and sugar stabilized by incorporation therein of a compound selected from the class consisting of ammonium and alkali metal salts of polyacrylic acid.

2. An ice cream composition comprising milk, cream, and sugar stabilized by incorporation therein of a compound selected from the class consisting of ammonium and alkali metal salts of polyacrylic acid, wherein the concentration of the stabilizer is from 0.05% to 1.0% by weight of said composition.

3. An ice cream composition comprising milk, cream, and sugar stabilized by the incorporation therein of a sodium polyacrylate, the concentration of the sodium polyacrylate being from 0.2% to 0.5% by weight of the ice cream composition.

JONAS KAMLET.

No references cited.